US007981954B2

(12) United States Patent
Fischer et al.

(10) Patent No.: US 7,981,954 B2
(45) Date of Patent: Jul. 19, 2011

(54) ANTI-CORROSION COATINGS CONTAINING THIOAMIDE GROUPS

(75) Inventors: Gerhard Fischer, Dirmstein (DE); Monica Fernandez Gonzalez, Frankenthal (DE); Marc Schroeder, Heidelberg (DE); Konrad Roschmann, Ludwigshafen-Edigheim (DE); Alexander Goethlich, Mannheim (DE); Hermann Bergmann, Mannheim (DE); Guido Vandermeulen, Ilvesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 184 days.

(21) Appl. No.: 11/815,057

(22) PCT Filed: Jan. 26, 2006

(86) PCT No.: PCT/EP2006/050462
§ 371 (c)(1),
(2), (4) Date: Jul. 30, 2007

(87) PCT Pub. No.: WO2006/079643
PCT Pub. Date: Aug. 3, 2006

(65) Prior Publication Data
US 2009/0156736 A1    Jun. 18, 2009

(30) Foreign Application Priority Data

| Jan. 28, 2005 | (DE) | 10 2005 004 292 |
| Dec. 20, 2005 | (DE) | 10 2005 061 317 |
| Dec. 20, 2005 | (DE) | 10 2005 061 318 |
| Dec. 20, 2005 | (DE) | 10 2005 061 319 |
| Dec. 20, 2005 | (DE) | 10 2005 061 320 |

(51) Int. Cl.
| *B60K 15/04* | (2006.01) |
| *C08K 5/00* | (2006.01) |
| *C08G 18/28* | (2006.01) |
| *C04B 9/02* | (2006.01) |
| *C04B 28/36* | (2006.01) |
| *C07C 327/00* | (2006.01) |
| *C07C 333/00* | (2006.01) |

(52) U.S. Cl. ..... 524/225; 524/210; 524/401; 106/14.43; 106/14.05; 106/287.32; 564/74; 564/75; 564/76; 564/77; 564/78

(58) Field of Classification Search ............. 524/210, 524/225; 564/74, 75, 76, 77, 78
See application file for complete search history.

(56) References Cited

U.S. PATENT DOCUMENTS

| 2,201,171 | A | * | 5/1940 | Hanford | 558/30 |
| 2,280,578 | A | * | 4/1942 | William et al. | 564/78 |
| 4,000,159 | A | * | 12/1976 | Scoggins et al. | 548/543 |
| 4,663,384 | A | * | 5/1987 | Penzel et al. | 524/519 |
| 4,996,004 | A |   | 2/1991 | Buecheler et al. | |
| 5,470,908 | A | * | 11/1995 | Schmidt et al. | 524/520 |
| 5,707,941 | A |   | 1/1998 | Haeberle | |
| 5,969,019 | A | * | 10/1999 | Kanai et al. | 524/140 |
| 6,241,830 | B1 | * | 6/2001 | Shimakura et al. | 148/251 |
| 6,583,214 | B1 |   | 6/2003 | Haeberle et al. | |
| 2003/0220446 | A1 | * | 11/2003 | Faler et al. | 524/590 |
| 2004/0029745 | A1 | * | 2/2004 | Mukkamala | 508/284 |
| 2006/0211815 | A1 |   | 9/2006 | Licht et al. | |

FOREIGN PATENT DOCUMENTS

| DE | 2943833 | 5/1980 |
| DE | 199 14 896 | 10/2005 |
| EP | 0101007 | 2/1984 |
| EP | 0 878 519 | 11/1998 |
| GB | 996489 | 6/1965 |
| GB | 2 032 963 | 5/1980 |
| JP | 2000-297384 | 10/2000 |
| JP | 2002-064856 | 2/2002 |
| JP | 2002-241957 | 8/2002 |
| JP | 2002241957 A * | 8/2002 |
| JP | 2003-073856 | 3/2003 |
| WO | WO 02/64856 | 8/2002 |
| WO | WO 2004/101638 | 11/2004 |
| WO | WO 2005/005565 | 1/2005 |

OTHER PUBLICATIONS

Kumar, A., Sing, M.M. "Substituted dithiomalonamides as inhibitor for the corrosion of AISI 304SS in phosphoric acid-hydrochloric acid mixture." Anti-Corrosion Methods and Materials, vol. 40, p. 4-7, 1993.*
Rangelov, S., Mircheva, A. "The influence of metal complexes of tetramethyldithio-oxamide on the rate of acid corrosion of steel." Corrosion Science, vol. 38, No. 2, p. 301-306, 1966.*
Murai, Toshiaki. "Thio-, Seleno-, Telluro-Amides" Top Curr Chem, vol. 251, p. 247-272, 2005.*
Ozcan, M. et al.; "Electrochemical and Quantum Chemical Studies of Some Sulphur-containing Organic Compounds as Inhibitors for the Acid Corrosion of Mild Steel"; 2004; Progress in Organic Coatings; XP004610265; vol. 51, No. 3, pp. 181-187.
Houben-Weyl; Methoden der Organischen Chemie, vol. XIV, Makromolekulare Stoffe [Macromolecular Compounds]; Georg Thieme Verlag; Stuttgart; 1961, pp. 192-209.
Houben-Weyl; Methoden der Organischen chemie, vol. XIV, Makromoleculare Stoffe [Macromolecular Compounds]; Georg Thieme Verag, Stuttgart, 1961, pp. 411-420.

(Continued)

*Primary Examiner* — Vasu Jagannathan
*Assistant Examiner* — Anthony H Sheh
(74) *Attorney, Agent, or Firm* — Oblon, Spivak, McClelland, Maier & Neustadt, L.L.P.

(57) ABSTRACT

Methods for controlling atmospheric corrosion of a metallic surface including coating the metallic surface with a coating material containing at least one compound having at least one thioamide group.

17 Claims, 1 Drawing Sheet

OTHER PUBLICATIONS

Houben-Weyl; Methoden der Organischen Chemie, vol. XIV, Madromolecualre Stoffe; Georg Thieme Verag, Stuttgart, 196, pp. 133ff.

Houben-Weyl; Methoden der Organischen Chemie, vol. XIV, Makromelekulare Stoffe, Georg Thieme Verlag, Stuttgart, 1961, pp. 297-333.

Adolf Echte; "Handbuch der Technischen Polymerchemie, VCH Verlagsgesellschaft Weinheim"; 1993; 104-120.

W. Holley; "ZFL-Zeitschrift fur Lebensmitteltechnologie und-Verfahrenstechnik"; 1982; 33 (3). pp. 139-155.

Douglas Wicks, et al.; "Blocked Isocyanates III: Part A. Mechanisms and Chemistry"; 1999; Progress in Organic Coatings, vol. 36, pp. 148-172.

Douglas Wicks, et al.; "Blocked Isocyanates III Part B: Uses and Application of Blocked Isocyanates"; 2001; Progress in Organic Coatings, vol. 41, pp. 1-83.

Douglas Wicks, et al.; "Multistep Chemistry inThin Films; the Challenges of Blocked Isocyanates"; 2001; Progress in Organic Coatings, vol. 43, pp. 131-140.

Ullmanns Enzyklopadie der Technischen Chemie, 4$^{th}$ Edition, vol. 15, pp. 668-670.

* cited by examiner

Comparative Example 1    Inventive Example 1    Inventive Example 1 (repeat)

ANTI-CORROSION COATINGS CONTAINING THIOAMIDE GROUPS

TECHNICAL FIELD

The present invention relates to new coating materials for atmospheric corrosion control.

BACKGROUND AND PRIOR ART

DE-A 29 43 833 discloses the use of thiourea and of thiourea derivatives as additives in an aqueous conversion coating composition which comprises free sulfuric acid, hydrogen peroxide, and silica. Treatment is principally with phosphorus compounds; thioacetamide is included in the description as a co-constituent.

All that is explicitly disclosed is the immersion of substrates to be coated in a bath at between 20 and 35° C. with subsequent hot-water rinsing in the range between 60 and 70° C. and subsequent drying at temperatures above 70° C.

EP-A 878 519 discloses preferably chromium-free, aqueous compositions for producing corrosion control coatings, comprising 0.2 to 50 g/l of a thiocarbonyl compound, 0.1 to 5 g/l of phosphates, and water-soluble binders or binder dispersions. 10 to 500 g/l of $SiO_2$ may optionally be present. The thiocarbonyl compounds may be, for example, thiourea, thioamides, thioaldehydes or thiocarboxylic acids.

The corrosion coatings described therein require heating and drying of the coated material in a hot environment, or coating of a substrate which has been heated beforehand. This requires temperatures between 50 and 250° C. Only coat thicknesses of 0.1 to 20 µm are disclosed; coat thicknesses outside of this range are described as being ineffective or uneconomic.

JP-A 2002-64856, JP-A 2002-241957, JP-A 297384, and JP-A 2003-73856 disclose various kinds of aqueous compositions for producing corrosion control coatings, comprising aqueous different aqueous polymer dispersions, further components, and also thiocarbonyl compounds, such as thiourea or ethanethioamide, for example. Thioamides containing more than one thioamide group are not disclosed for atmospheric corrosion control.

From the prior art recited it is apparent that thioamides have to date been disclosed predominantly in coil coatings, by which are meant coatings on rolled metal strips which following their production are wound up into rolls (called coils) for storage and transportation. These metal strips constitute the starting material for the majority of sheetlike metallic workpieces, examples being automobile parts, bodywork parts, instrument casings, exterior architectural facings, ceiling panels or window profiles. For these purposes the appropriate metal sheets are shaped by means of appropriate techniques such as punching, drilling, folding, profiling and/or deep drawing. Relatively large components, such as automobile bodies, for example, are assembled if appropriate by the welding together of a number of individual parts.

Coil coating is the continuous coating of metal strips with usually liquid coating materials. Metal strips with a thickness of 0.2 to 2 mm and a width of up to 2 m are transported at a speed of up to 200 m/min through a coil coating line, and are coated in the process. For this purpose it is possible, for example, to use cold-rolled strips of soft steels or construction-grade steels, electrolytically galvanized thin sheet, hot-dip-galvanized steel strip, or strips of aluminum and/or aluminum alloys. Typical lines comprise a feed station, a strip store, a cleaning and pretreatment zone, a first coating station along with baking oven and downstream cooling zone, a second coating station with oven, laminating station, and cooling, and a strip store and winder.

Characteristic of coil coatings are thin coats of the coating materials which have a dry coat thickness of usually well below 80 µm, often below 60 µm, below 50 µm, and even below 40 µm. Moreover, the metal sheets are processed with a high throughput, necessitating short residence times; in other words, necessitating drying at elevated temperature following application of the coating, in order to make the coating material durable quickly.

Coating processes of this kind can of course be carried out only on lines produced specifically for that purpose, with the consequence that existing constructions, for example, cannot be coated with processes of this kind.

SUMMARY OF THE INVENTION

It was an object of the present invention to develop corrosion control processes which allow the coating of components which cannot be coated and dried and/or cured in units developed specifically for those purposes.

This object has been achieved through the use of coating materials which comprise at least one compound (D) which contains at least one thioamide group (—(C=S)—$NR^1R^2$) in atmospheric corrosion control.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
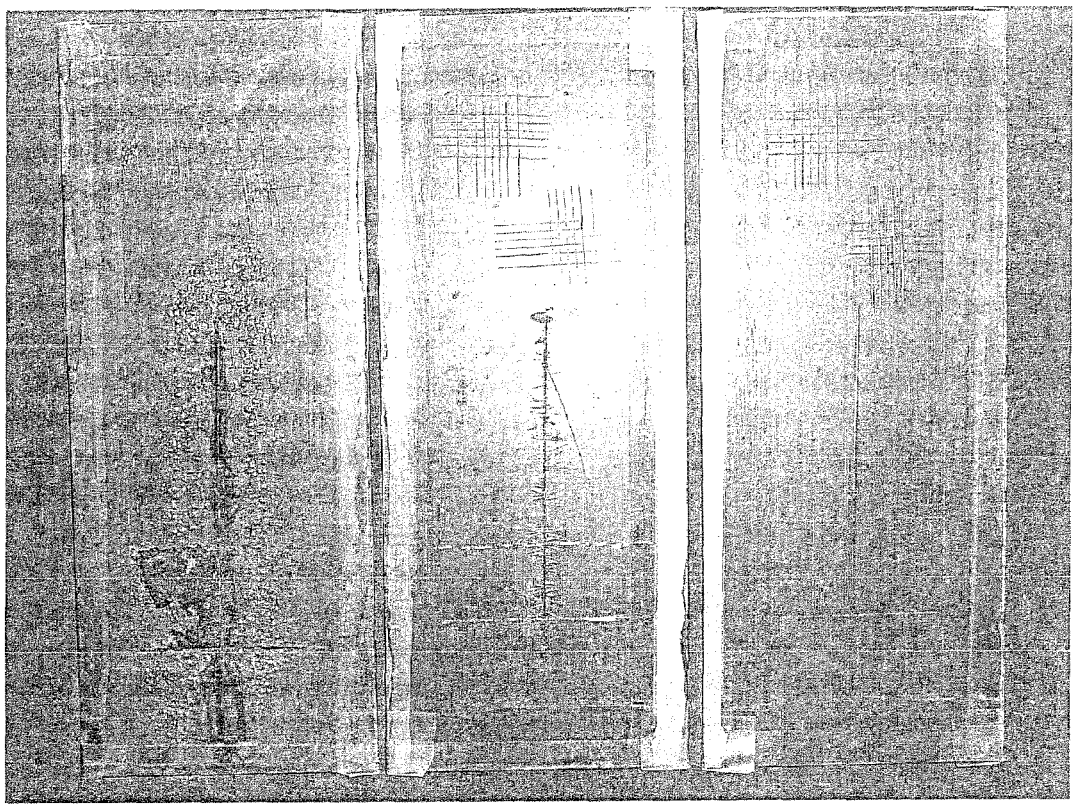
FIG. 1 is a picture of the metal panels following the Salt Spray Test/Evaluation, wherein Comparative Example 1 is on the left, Example 1 is in the middle, and a repetition of Example 1 is on the right.

The difference in the demands on coatings and coating materials from atmospheric corrosion control as compared with corrosion control via coil coating is that in atmospheric corrosion control the coatings have a substantially higher coat thickness than coil coatings and are dried and cured at ambient temperatures, so that drying and curing occupy substantially longer time periods. During this time period the uncured coatings are susceptible to influences such as water spray or weathering effects, so that the requirements imposed on the coating materials are substantially different from those imposed on coil coating materials.

Found additionally has been a method of applying corrosion control coats to metallic surfaces by treating the metallic surface with a formulation at least comprising a binder, a pigment and/or a filler, and a corrosion preventive agent, the corrosion preventive agent being at least one compound (D).

Preferred compounds (D) are (D1) thioamides of the general formula (II), $R^4{}_n$—$R^3$—(C=S)$NR^1R^2$, and (D2) thioamides containing at least 2 thioamide groups, n being a natural number from 1 to 5, and the radicals $R^1$, $R^2$, $R^3$, and $R^4$ having the following definitions:

$R^1$ and $R^2$ each independently are H or a linear or branched, optionally substituted alkyl radical having 1 to 20 C atoms, cycloalkyl radical having 3 to 12 C atoms or aryl radical having 6 to 12 C atoms, it also being possible for the radicals $R^1$ and $R^2$ together with the nitrogen atom to form a five- to 12-membered ring, $R^3$ is an (n+1)-valent hydrocarbon radical having 1 to 30 C atoms, and $R^4$ is a functional group.

The method of the invention can be used to provide protection against corrosion in particular to metallic surfaces which in the course of service are in contact with atmospheric air, although the surfaces in question may also be those which in the course of service are in contact with water, soil or other corrosive media.

The metallic surfaces to be protected against corrosion by means of the method of the invention may in principle be any desired surfaces. Preferably, though, they are the surfaces of metallic structures or metal constructions and/or their required components. Metal constructions and structures are typically joined from construction-grade steel, such as steel girders, steel pipes or steel panels, by riveting, welding or screwing, to form corresponding constructions. In one embodiment of the invention the coated articles may be stationary metallic structures such as, for example, buildings, bridges, power masts, tanks, containers, buildings, pipelines, power plants, chemical plants, ships, cranes, posts, bulkheads, valves, pipes, tanks, fittings, flanges, couplings, halls, roofs, and construction-grade steel. In the case of this embodiment, corrosion control coatings are typically applied by spreading or spraying on site. This corrosion control may be either first-time control or a renovation. The drying and curing of such corrosion control coatings take place under atmospheric conditions, in other words at ambient temperature, and in the presence of air and typical atmospheric humidity. The relative atmospheric humidity may have any desired value, but is preferably between 10% and 80% and more preferably between 30% and 70%. Depending on the degree of protection required, the protection of surfaces against corrosion by means of corrosion control coatings is also referred to as light, medium, and heavy duty corrosion control.

As far as the nature of the metal is concerned, any desired metals may be involved in principle. In particular, however, the metals or alloys involved are those which are typically employed as metallic construction materials and require protection from corrosion.

The surfaces in question are, in particular, those of iron, steel, zinc, zinc alloys, aluminum or aluminum alloys. Steel may comprise the typical alloying components known to the skilled worker. The surfaces in question may be surfaces of structures composed entirely of the stated metals or alloys. Alternatively they may be the surfaces of structures coated with Zn, Zn alloys, Al or Al alloys, the structures themselves being composed of other materials, as for example of other metals, alloys, polymers or composites. In one preferred embodiment of the invention the surfaces are those of untreated steel or of galvanized and/or aluminized steel.

Zinc alloys or aluminum alloys are known to the skilled worker. Typical constituents of zinc alloys comprise, in particular, Al, Pb, Si, Mg, Sn, Cu or Cd. Typical constituents of aluminum alloys comprise, in particular, Mg, Mn, Si, Zn, Cr, Zr, Cu or Ti. The term "zinc alloy" is also intended to include Al/Zn alloys in which Al and Zn are present in approximately equal quantity. The skilled worker selects the identity and amount of alloying constituents in accordance with the desired end application. Zn or aluminum coatings can be applied to steel by means for example of hot dip methods, such as hot dip galvanizing, or by means of sherardizing. Where the component is stationary or the geometry of the component does not permit otherwise, corresponding coats can also be applied by means of thermal spraying (spray galvanizing, spray aluminizing).

The preparation employed in accordance with the invention for applying corrosion control coats to metallic surfaces comprises at least one binder. This binder may optionally also contain crosslinkable groups. Binders for corrosion control paints and coatings are known to the skilled worker.

The preparation employed in accordance with the invention for applying coating materials comprises at least one binder (A) and also crosslinkable components (B). The crosslinkable components may be at least one crosslinker, which is used in addition to a binder, or may in this case be crosslinkable groups, which are joined to the binder. The binder can of course also have crosslinkable groups and a crosslinker can be used additionally.

A variety of possible combinations arise here. By way of example, binder and crosslinker can be used separately from one another. In that case the binder comprises reactive functional groups which are able to react with complementary reactive functional groups in the crosslinkers. Alternatively the binders may also be self-crosslinking binders, comprising reactive functional groups which are able to enter into crosslinking reactions with groups of their own kind ("with themselves") or with complementary reactive functional groups on the same polymer. It is possible for exclusively the crosslinkers to react with one another.

The binders (A) may be the typical binders. Examples of suitable binders comprise (meth)acrylate (co)polymers, partially hydrolyzed polyvinyl esters, polyesters, alkyd resins, polylactones, polycarbonates, polyethers, epoxy resin-amine adducts, polyureas, polyamides, polyimides or polyurethanes. It is of course also possible to use mixtures of different polymers, provided the mixing does not give rise to any unwanted effects.

Curing may proceed by a variety of mechanisms, depending on the nature of the binder system employed. By way of example the curing involved may be purely physical curing, produced by the evaporation of the solvent used. It may also be oxidative curing through reaction of the binder system with the oxygen in the air. Finally, it may also be chemical crosslinking (reactive crosslinking). Reactive binder systems comprise crosslinkable components. The crosslinkable components may be of low molecular mass, oligomeric or polymeric. The systems in question may be preferably one-component (1K) or else two-component (2K) systems. Reactively crosslinking systems also comprise moisture-curing binder systems, where the atmospheric moisture functions as a curing component. It will be appreciated that a binder system may also cure through a combination of different curing methods. In the case of 2K systems the binder component and curing component are mixed, in a way which is known in principle, before the formulation is used.

The invention can be performed using aqueously soluble or organically soluble binder systems. Preference is given to binder systems on an aqueous basis.

Binder systems for corrosion control coatings, especially corrosion control systems on an aqueous basis, are known in principle to the skilled worker. They may for example be epoxy resins, polyacrylates, styrene-acrylate polymers, polyesters, alkyd resins, polyurethanes or styrene-butadiene polymers.

The amount of binders (A) in the formulation is 15% to 70% by weight, based on the amount of all the components of the formulation, including the solvent. It is set by the skilled worker in accordance with the desired properties of the coating. The amount is preferably 20% to 60% by weight and more preferably 25% to 50% by weight.

With particular preference the polymer of the binder (A) is selected from the group consisting of
(A1) polyacrylates,
(A2) polyurethanes, and
(A3) styrene-butadiene polymers.

Additionally possible are (A4) alkyd resins.

Polyacrylates (A1) are generally composed of

A1a) 40% to 100%, preferably 60% to 100%, more preferably 80% to 100% by weight of at least one principal monomer containing a free-radically polymerizable group, A1b) 0% to 40%, preferably 0% to 25%, more preferably 0% to 15% by weight of further copolymerizable monomers other than A1a), containing a free-radically polymerizable group, and A1c) 0% to 4%, preferably 0.01% to 2%, more preferably at least 0.05% to 1% by weight of at least one crosslinker.

Principal monomers A1) comprise a free-radically polymerizable group and are selected from $C_1$-$C_{20}$ alkyl (meth)acrylates, vinyl esters of carboxylic acid comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms, or mixtures of these monomers.

Examples include (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate.

Suitability is also possessed in particular by mixtures of the (meth)acrylic acid alkyl esters.

Vinyl esters of carboxylic acids having 1 to 20 C atoms are for example vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4n-decylstyrene, and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Vinyl ethers include for example vinyl methyl ether or vinyl isobutyl ether. Preferred vinyl ethers are those of alcohols comprising 1 to 4 C atoms.

Suitable monomers (A1a) are preferably the alkyl (meth)acrylates, preferably ($C_2$ to $C_{10}$ alkyl) acrylates and methacrylates, and the vinylaromatics, and also mixtures of these compounds.

Very particular preference is given to methyl methacrylate, n-butyl acrylate, n-hexyl acrylate, octyl acrylate, 2-ethylhexyl acrylate, and styrene, and also mixtures of these monomers, as monomers (A1a).

Especial preference is given to methyl methacrylate, n-butyl acrylate, 2-ethylhexyl acrylate, and styrene, and also mixtures of these monomers, as monomers (A1a).

Further copolymerizable monomers A1b) are monomers which have a free-radically polymerizable group that are different from those specified under (A1a), preferably monomers which besides the free-radically polymerizable double bond comprise at least one, preferably 1 to 3, more preferably 1 to 2, and very preferably one further functional group, such as hydroxy groups, carboxamide groups or carboxyl groups, for example, especially $C_1$-$C_{10}$ hydroxyalkyl (meth)acrylates, (meth)acrylamide, ethylenically unsaturated acids or acid anhydrides, especially carboxylic acids, such as (meth)acrylic acid, crotonic acid or dicarboxylic acids, such as itaconic acid, maleic acid or fumaric acid, for example.

(Meth)acrylic acid stands in this description for methacrylic acid and acrylic acid.

Crosslinkers A1c) are of the kind which have at least two free-radically polymerizable double bonds, preferably 2 to 6, more preferably 2 to 4, very preferably 2 to 3, and in particular 2.

The at least two free-radically polymerizable double bonds of the crosslinkers A1c) may be selected from the group consisting of (meth)acrylic, vinyl ether, vinyl ester, allyl ether, and allyl ester groups.

These free-radically polymerizable groups in the crosslinkers A1c) may be alike or different.

Examples of compounds A1c) having alike free-radically polymerizable groups are 1,2-ethanediol di(meth)acrylate, 1,3-propanediol di(meth)acrylate, 1,2-propanediol di(meth)acrylate, 1,4-butanediol di(meth)acrylate, 1,6-hexanediol di(meth)acrylate, neopentyl glycol di(meth)acrylate, trimethylolpropanetriol di(meth)acrylate, pentaerythritol tetra (meth)acrylate, 1,4-butanediol divinyl ether, 1,6-hexanediol divinyl ether, 1,4-cyclohexanediol divinyl ether, and divinylbenzene. Preference is given to divinylbenzene, 1,4-butanediol diacrylate, and 1,6-hexanediol diacrylate.

Examples of compounds A1c) with different free-radically polymerizable groups are allyl acrylate, allyl methacrylate, methallyl acrylate, methallyl methacrylate, but-3-en-2-yl (meth)acrylate, but-2-en-1-yl (meth)acrylate, 3-methyl-but-2-en-1-yl (meth)acrylate, esters of (meth)acrylic acid with geraniol, citronellal, cinnamyl alcohol, glycerol monoallyl or diallyl ether, trimethylolpropane monoallyl or diallyl ether, ethylene glycol monoallyl ether, diethylene glycol monoallyl ether, propylene glycol monoallyl ether, dipropylene glycol monoallyl ether, 1,3-propanediol monoallyl ether, 1,4-butanediol monoallyl ether, and, furthermore, diallyl itaconate. Allyl methacrylate is particularly preferred.

The polyacrylates (A1) can be prepared in a conventional manner in accordance with the processes of emulsion polymerization, which are common knowledge, from the monomers, using the typical emulsifying and dispersing assistants and polymerization initiators.

Dispersants suitable for implementing free-radically aqueous emulsion polymerizations are emulsifiers that are typically employed, in amounts of 0.1% to 5%, in particular of 0.2% to 3%, by weight, or protective colloids in amounts of 5% to 40%, in particular of 5% to 25%, by weight, based on the monomers.

Customary emulsifiers are, for example, ammonium salts or alkali metal salts of higher fatty alcohol sulfates, such as Na n-lauryl sulfate, fatty alcohol phosphates, ethoxylated $C_8$ to $C_{10}$ alkylphenols having a degree of ethoxylation of 3 to 30, and ethoxylated $C_8$ to $C_{25}$ fatty alcohols having a degree of ethoxylation of 5 to 50. Also possible are mixtures of nonionic and ionic emulsifiers. Also suitable are phosphate- or sulfate-functional, ethoxylated and/or propoxylated alkylphenols and/or fatty alcohols. Further suitable emulsifiers are listed in Houben-Weyl, Methoden der organischen Chemie, Volume XIV, Makromolekulare Stoffe [Macromolecular compounds], Georg Thieme Verlag, Stuttgart, 1961, pages 192 to 209.

Suitable protective colloids are high molecular mass natural substances such as starch, methylcellulose, pectins and gelatin, synthetic substances such as polyvinyl alcohol and polyvinylpyrrolidone. Further protective colloids are described at length in Houben-Weyl, loc. cit., pages 411 to 420.

Suitable by way of example are polyurethanes and copolymers of olefinic monomers with (meth)acrylic acid and/or maleic acid.

Suitable polymerization initiators include all those capable of triggering a free-radical emulsion polymerization in aqueous media. They are used generally in amounts of 0.1% to 10%, preferably of 0.2% to 4%, by weight, based on the monomers. Typical compounds are inorganic peroxides, such as sodium and ammonium peroxidisulfate, and hydrogen peroxide, organic peroxides such as dibenzoylperoxide or tert-butyl hydroperoxide, and azo compounds such as azoisobutyrodinitrile. These initiators are suitable for reaction temperatures of from 50 to 100° C., that are typical of free-radical emulsion polymerizations. If lower reaction temperatures of about 40 to 60° C. are desired, preference is given to redox systems such as combinations of percompounds and a reducing coinitiator—the sodium salt of hydroxymethanesulfinic acid, ascorbic acid or iron (II) salts.

Dispersions which can be used in accordance with the invention include both primary and secondary dispersions. In the case of primary dispersions the base monomers are polymerized directly in the aqueous phase, in the form for example of an emulsion or miniemulsion, in which the monomers are dispersed in the aqueous phase with a droplet diameter of 0.1 to 0.2 μm, whereas in the case of secondary dispersions pre-prepared polymers are dispersed in a further step of the process, usually by polymerization in an organic solvent, with subsequent dispersing of the polymer in water, followed if appropriate by removal of the solvent from the dispersion, preferably by means of distillation.

The preparation of aqueous polymer dispersions by the process of free-radical emulsion polymerization is known per se (cf. Houben-Weyl, Methoden der organischen Chemie, Volume XIV, Makromolekulare Stoffe, loc. cit., pages 133ff).

A process which has been found particularly appropriate is a feed process, where the starting point is an initial charge consisting of a portion of the monomers, generally up to 20% by weight, water, emulsifier, and initiator. The remainder of the monomers and, if appropriate, regulators in emulsified form, and additionally an aqueous solution of further polymerization initiator, are added in tune with the rate of the polymerization.

Following the (co)polymerization it is possible for at least some of the acid groups present in the (co)polymer to be neutralized. This can be done, for example, using oxides, hydroxides, carbonates or hydrogen carbonates of alkali metals or alkaline earth metals, preferably hydroxides, which may be in association with any desired counterion or two or more thereof, examples being $Li^+$, $Na^+$, $K^+$, $Cs^+$, $Mg^{2+}$, $Ca^{2+}$ or $Ba^{2+}$. Also suitable for the neutralization are ammonia or amines, especially tertiary amines, such as methylamine, dimethylamine, trimethylamine, ethylamine, diethylamine, triethylamine, tributylamine, diisopropylethylamine, benzyldimethylamine, monoethanolamine, diethanolamine, triethanolamine, hydroxyethyldimethylamine, hydroxyethyidiethylamine, monopropanolamine, dipropanolamine, tripropanolamine, piperidine, piperazine, N,N'-dimethylpiperazine, morpholine or pyridine.

Ammonia is preferred for the neutralization. Preferably 50 to 100 mol % of the acid groups in the (co)polymer are neutralized, more preferably 75-100 mol %, very preferably 90-100, and in particular 100 mol %.

The aqueous polymer dispersion of the polyacrylates (A1) preferably has a solids content of 35% to 65%, more preferably of 45% to 55% by weight.

The glass transition temperature, Tg, of the copolymers is preferably in the range from 0 to 60° C., more preferably in the range from 5 to 40° C. (measured by the DSC method in accordance with DIN EN ISO 11357).

In a third, preferred embodiment of the invention the binder system is an aqueous or predominantly aqueous dispersion of polyurethanes (A2).

Aqueous dispersions of polyurethanes (A2) for producing corrosion control coatings are known in principle to the skilled worker. Details of polyurethanes for coating materials and also of their preparation are disclosed for example in "Paints and Coatings, 2.9 Polyurethane Coatings" in Ullmann's Encyclopedia of Technical Chemistry, 6th Edition 2000, Electronic Release. The aqueous dispersions of the polyurethanes (A2) may be either primary dispersions or secondary dispersions.

Polyurethanes for aqueous dispersions can be synthesized, in a way which is known in principle, from typical diisocyanates and also diols. With a view to effective film formation and good elasticity, diols particularly suitable for this purpose are those having a number-average molecular weight, $M_n$, of about 500 to 5000 g/mol, preferably about 1000 to 3000 g/mol. For this purpose it is possible to use both polyether diols and polyester diols. The amount of such diols of relatively high molecular weight is typically 10 to 100 mol % relative to the sum of all the diols. The desired hardness and elasticity of the film can be controlled by using, in addition to the diol already mentioned, low molecular weight diols having a number-average molecular weight $M_n$ of about 60 to 500 g/mol.

For the synthesis of polyurethanes for aqueous dispersions use is made, moreover, of monomers which comprise at least one isocyanate group or one group which is reactive toward isocyanate groups, and also, additionally, at least one hydrophilic group. These may be nonionic groups such as polyoxyethylene groups, acidic groups such as COOH, sulfonate or phosphonate groups, or basic groups such as amino groups. Preferably they are acidic groups. For use as binders for the formulation it is possible with preference for some or all of the acid groups to be neutralized with suitable bases. Preferred for this purpose are ammonia or amines. Further details on such polyurethane dispersions and also on their preparation are described at length in WO 2005/005565, page 4 line 13 to page 14 line 14. Further examples of suitable polyurethanes are disclosed in U.S. Pat. No. 5,707,941 or in WO 2004/101638, particularly page 2 line 31 to page 14 line 11.

The polyurethanes may also have been modified. By way of example, the compounds in question may be oxidatively curing urethane alkyds. For the preparation it is possible to subject, for example, triglycerides of unsaturated fatty acids to partial hydrolysis. The resultant OH group is able to react with the isocyanate groups in the course of polyurethane preparation.

With preference for performing the invention it is possible additionally to use polyurethanes (A2) having an average particle size of not more than 1000 nm, preferably less than 500, more preferably less than 200 nm, and in particular 20 to 200 nm.

Styrene-butadiene polymers (A3) can be synthesized by free-radically initiated aqueous emulsion polymerization of A3a) 19.9 to 80 parts by weight of conjugated aliphatic dienes [monomers A3a)], A3b) 19.9 to 80 parts by weight of vinylaromatic compounds [monomers A3b)], A3c) 0 to 10 parts by weight of ethylenically unsaturated carboxylic acids and/or dicarboxylic acids and/or the corresponding carboxamides [monomers A3c)], A3d) 0 to 20 parts by weight of ethylenically unsaturated carbonitriles [monomers A3d)]
and
A3e) 0 to 20 parts by weight of copolymerizable compounds [monomers A3e)] other than monomers A3b) to A3d),
the total amount of ethylenically unsaturated monomers A3a) to A3e) being 100 parts by weight, in the presence of water and 0.1 to 5 parts by weight of emulsifiers, based on the total monomer amount.

The aqueous copolymer dispersions are prepared using frequently
25 to 70 parts by weight of monomers A3a),
25 to 70 parts by weight of monomers A3b),
0 to 8 parts by weight of monomers A3c),
0 to 15 parts by weight of monomers A3d), and
0 to 15 parts by weight of monomers A3e)
and often
25 to 60 parts by weight of monomers A3a),
25 to 70 parts by weight of monomers A3b),
0.5 to 5 parts by weight of monomers A3c),
0 to 10 parts by weight of monomers A3d), and
0 to 10 parts by weight of monomers A3e).

Suitable conjugated aliphatic dienes [monomers A3a)] include preferably butadiene, isoprene, penta-1,3-diene, dimethylbutadiene and/or cyclopentadiene, preferably butadiene.

Vinylaromatic compounds [monomers A3b)] include, in particular, styrene, α-methylstyrene and/or vinyltoluene, preferably styrene.

Ethylenically unsaturated carboxylic acids and/or dicarboxylic acids [monomers A3c)] used with preference are α,β-monoethylenically unsaturated monocarboxylic and dicarboxylic acids having 3 to 6 C atoms, such as acrylic acid, methacrylic acid, maleic acid, fumaric acid, itaconic acid, preferably (meth)acrylic acid, and itaconic acid, more preferably acrylic acid. Carboxamides used are the amides of the abovementioned ethylenically unsaturated carboxylic acids, preferably (meth)acrylamide.

Preferred ethylenically unsaturated carbonitriles are acrylonitrile and/or methacrylonitrile [monomers A3d)] and preferred copolymerizable vinyl compounds [monomers A3e)] are esters of acrylic and/or methacrylic acid in which the alkyl group comprises 22 or fewer carbon atoms, examples being methyl (meth)acrylate, ethyl (meth)acrylate, isopropyl (meth)acrylate, butyl (meth)acrylate, 2-ethylhexyl (meth) acrylate, and also allyl esters of saturated monocarboxylic acids, vinyl esters, vinyl ethers, vinyl ketones, dialkyl esters of unsaturated dicarboxylic acids, vinyl acetate and/or vinylpyridine, vinyl chloride, vinylidene chloride.

The emulsifiers are used preferably in amounts of 0.2 to 4.5 parts by weight per 100 parts by weight of the abovementioned monomers A3a) to A3e). Emulsifiers that are suitable include, in particular, ethoxylated fatty alcohols and sulfuric monoesters of ethoxylated fatty alcohols, composed in each case of a linear or branched alkyl radical having 8 to 18 carbon atoms, which is linked via an ether group to a poly- or oligo-ethyleneoxy sequence. Suitable poly- or oligo-ethyleneoxy sequences include ethylene oxide oligomers having a degree of polymerization of 2 to 30 ethylene oxide units, preferably 2 to 7 ethylene oxide units.

Particularly preferred fatty alcohol ethers and fatty alcohol ether sulfates are those comprising a $C_8$-$C_{18}$ alkyl radical as fatty alcohol, e.g., caprylyl, capryl, lauryl, myristyl, oleyl or elaidyl alcohol. Particular preference is given to lauryl oligoethyleneoxysulfate, palmityl oligoethyleneoxysulfate, stearyl oligoethyleneoxysulfate, and oleyl oligoethyleneoxysulfate, the oligoethyleneoxy sequence being composed with particular preference of 2 to 7 ethylene oxide units.

As fatty alcohol in this case it is possible to use the pure starting compound or else the mixtures of homologous and isomeric alkyl radicals that are frequently obtained in the case of the synthetic fatty alcohols, an example being a mixture of $C_{12}$ and $C_{13}$ fatty alcohols. It is typical for the degree of ethoxylation to express only the average value of a distribution.

The free acid group of the sulfate radical is typically present in neutralized form as an ammonium salt or an alkali metal salt, although neutralization may also be carried out during the metered addition, by the base that is used.

As emulsifiers it is additionally possible to use esters or monoesters of alkylpolyoxyethylenesulfosuccinates. In these compounds the sulfosuccinic acid is singly or doubly esterified with poly- or oligoethylene oxide having 2 to 30 ethylene oxide units, preferably 2 to 7 ethylene oxide units, in particular 2 to 5 ethylene oxide units, the end group of said esters and monoesters consisting of an alkyl radical with 8 to 18 carbon atoms, which is linear or branched. $C_8$-$C_{18}$ carbon-comprising alkyl radicals include in particular the following: caprylyl, capryl, lauryl, myristyl, stearyl, and elaidyl alcohol.

The free-radical aqueous emulsion polymerization is initiated in a manner familiar to the skilled worker by means of water-soluble free-radical initiators. Particular such initiators include organic and/or inorganic peroxides, such as alkali metal peroxodisulfates and/or azo compounds, for example, or combined systems composed of at least one reducing agent and at least one peroxide and/or hydroperoxide, such as tert-butyl hydroperoxide and the sodium salt of hydroxymethanesulfinic acid, or hydrogen peroxide and ascorbic acid, or combined systems additionally comprising a small amount of a metal compound which is soluble in the polymerization medium and whose metallic component is able to exist in a plurality of valence states, an example being ascorbic acid/iron (II) sulfate/hydrogen peroxide, in which the ascorbic acid frequently may be replaced by the sodium salt of hydroxymethanesulfinic acid, sodium sulfite, sodium hydrogen sulfite and/or sodium disulfite and the hydrogen peroxide by tert-butyl hydroperoxide or alkali metal peroxide sulfates and/or ammonium peroxodisulfates. Instead of a water-soluble iron (II) salt it is common to use a combination of water-soluble Fe/V salts. The initiator system can be added continuously or in stages at the rate of which it is consumed in the course of the free-radical aqueous emulsion polymerization. In each specific case this will depend in a manner known per se both on the chemical nature of the initiator system and on the polymerization temperature. Very particular preference is given to peroxides, examples being alkali metal peroxodisulfates, such as sodium or ammonium peroxodisulfate. The free-radical initiators, which are normally in solution in water, are generally added to the polymerization reactor via a separate feed.

The ideal amount of water-soluble initiators can easily be determined by appropriate preliminary tests. Typically the water-soluble initiators are added in amount of 0.1 to 2.0% by weight, based on the total mass of the monomers to be polymerized.

For the emulsion polymerization it is additionally possible to add the known molecular weight regulators, such as mercapto compounds, tertiary dodecyl mercaptan for example, or dimeric α-methylstyrene, Further auxiliaries can be added as well, such as complexing agents, an example being ethylenediaminetetraacetic acid Na salt (EDTA-Na), for disruptive metal ions, for example; inhibitors, an example being hydroquinone monomethyl ether; or foam suppressants, to the emulsion polymerization. The molecular weight regulators and auxiliaries are known and are described for example in Houben-Weyl, Methoden der organischen Chemie, Vol. XIV/1, p. 297 ff., 1961, Stuttgart.

In one particular embodiment of the emulsion polymerization for preparing the aqueous dispersion of copolymers it can be advantageous to add up to 15% by weight of the total amount of emulsifiers used to the reaction mixture right at the beginning of the polymerization and then to add the remainder, i.e., up to 85% by weight, of the total emulsifiers used within the time taken to reach up to 40% of the total conversion of the starting components.

Also decisive for the desired properties of the aqueous copolymer dispersion is the 1% to 50% neutralization of the copolymerizable carboxylic acids and/or dicarboxylic acids [monomers A3c)] used for the polymerization. Preferably 5% to 45% of the carboxylic acid groups deriving from them are neutralized with bases.

Particularly suitable bases are aqueous solutions of alkali metal oxides or hydroxides, very preferably aqueous ammonium, sodium or potassium hydroxide solutions.

It has proven advantageous if components A3a) to A3e) are supplied to the polymerization reactor during the polymerization via a common supply line. In one embodiment of the process the components A3a) to A3e) and at least part of the water are mixed to an emulsion by a mixing means during their supply.

Particularly suitable mixers are dynamic mixers, whose mixing elements comprise moving parts, and static mixers, i.e., mixing elements without moving parts in the interior, which operate in particular in accordance with the inline principle. Suitable mixers are described for example in A. Echte, Handbuch der technischen Polymerchemie, VCH Verlagsgesellschaft Weinheim, p. 104 ff. (1993).

Examples of suitable dynamic inline mixers are the Kratz heat exchangers described in ZFL-Zeitschrift fur Lebensmitteltechnologie und-Verfahrenstechnik (1982) 33(3), p. 139 ff., comminuting machines operating on the rotor-stator principle, such as toothed-wheel dispersers, colloid mills and corundum disk mills, and also high-pressure and ultrasonic homogenizers.

Further suitable dynamic inline mixers are continuous tube mixers.

Suitable static inline mixers are for example those described in ZFL-Zeitschrift fur Lebensmifteltechnologie und -Verfahrenstechnik (1982) 33(3) p. 139 ff., such as Ross-ISG mixers, in which the fluid stream is passed through perforated internals which break it down into substreams, which are then displaced laterally and recombined in a different order, or static mixers which comprise two or more fixed mixing elements of identical kind which are installed one behind another in a tube or duct and are each staggered by 90° (e.g., Kenics, Sulzer SMV, and Sulzer SMX mixers).

Further suitable static inline mixers are shear gap mixers, such as the jet dispersers described in EP-B-101 007.

Further suitable mixers also include apparatus for inline emulsification, such as membranes, jet mixers, mixing nozzles, and curved tubular apparatus having a substantially circular or ellipsoidal cross section.

Alkyd resins (A4) are polycondensation resins formed from polyols, polybasic carboxylic acids, and fatty oils or free natural and/or synthetic fatty acids; at least one polyol must have a functionality of three or more.

Examples of suitable dicarboxylic acids comprise aliphatic dicarboxylic acids such as adipic acid, azelaic acid, sebacic acid, dodecanedioic acid, aliphatically cycloaliphatic such as dimer fatty acids, i.e., reaction products of unsaturated fatty acids with one another, cycloaliphatic dicarboxylic acids such as 1,4- or 1,3-cyclohexanedicarboxylic acid, tricyclodecanedicarboxylic acid, and aromatic dicarboxylic acids such as isophthalic acid, terephthalic acid or phthalic acid. It is of course also possible to use derivatives of dicarboxylic acids. Particularly suitable are anhydrides such as phthalic anhydride, hexahydrophthalic anhydride or tetradehydrophthalic anhydride, for example.

Examples of suitable dialcohols comprise aliphatic alcohols such as, for example, ethylene glycol, diethylene glycol, triethylene glycol, propylene glycol, 1,3-butanediol, 1,3-propanediol, 1,4-butanediol, neopentyl glycol, 1-methylpropane-1,3-diol, 2-butyl-2-ethylpropanediol, pentanediols, hexanediols, octanediols, dodecanediol, neopentyl glycol hydroxypivalate, cycloaliphatic alcohols such as 1,4- or 1,3-cyclohexane-dimethanol, 3 (or 4), 8 (or 9)-bis(hydroxymethyl)tricyclo[$5.2.1.0^{2,6}$]decane isomer mixtures and bis(4-hydroxycyclohexyl)methane or -propane, and dimer diols (hydrogenated dimer fatty acids). Of course it is also possible, in a known way, to use derivatives of alcohols, such as esters, for example, especially the corresponding methyl or ethyl esters.

Besides linear binders it is also possible to use branched binders. Suitable monomers for generating branching comprise tricarboxylic acids or their anhydrides such as trimellitic anhydride or trimesic acid and trialcohols such as trimethyloialkanes of which examples include trimethylolethane or trimethylolpropane.

Preferred polyhydric alcohols are glycerol, pentaerythritol, trimethylolethane, trimethylolpropane, various diols such as ethane-/propanediol, diethylene glycol, neopentyl glycol.

Preferred polybasic carboxylic acids are phthalic acid (anhydride) (PAn), isophthalic acid, terephthalic acid, trimellitic anhydride, adipic acid, azelaic acid, sebacic acid.

Examples of suitable oil components or fatty acids include drying oils, such as linseed oil, oiticica oil or tung oil, semidrying oils, such as soybean oil, sunflower oil, safflower oil, ricinene oil or tall oil, nondrying oils, such as castor oil, coconut oil or peanut oil, or free fatty acids of above oils, or synthetic monocarboxylic acids.

The molar mass of typical alkyd resins is between 1500 and 20 000, preferably between 3500 and 6000. The acid number is preferably 2 to 30 mg KOH/g, or 35-65 mg KOH/g in the case of water-dilutable resins. The OH number is generally up to 300, preferably up to 100 mg KOH/g.

As polymers (A) it is also possible of course to conceive of hybrids or mixtures of the aforementioned polymers.

Preference is given to those polymer dispersions of the invention in which the glass transition temperature as measured by the DSC method to DIN EN ISO 11357 of the polymer (A)
in the case of polyacrylates (A1) is between 0 and 60° C.,
in the case of polyurethanes (A2) is up to 75° C. or
in the case of styrene-butadiene polymers (A3) is between 0 and 60° C.
in the case of alkyd resins (A4) is between 0 and 60° C.

Particular preference is given to those polymer dispersions of the invention in which the glass transition temperature of the polymer (A)
in the case of polyacrylates (A1) is between 5 and 40° C.,
in the case of polyurethanes (A2) is between 0 and 60° C. or
in the case of styrene-butadiene polymers (A3) is between 5 and 40° C.
in the case of alkyd resins (A4) is between 5 and 40° C.

Preference is further given to those polymer dispersions in which the DIN 53495 water absorption ("Testing of polymers—Determination of water absorption", method 3 over the course of 24 hours at 23° C.) of the polymer (A)
  in the case of polyacrylates (A1) is not more than 25%, preferably not more than 10%, and more preferably not more than 5% by weight,
  in the case of polyurethanes (A2) is up to 100%, preferably up to 50%, and more preferably up to 30% by weight or
  in the case of styrene-butadiene polymers (A3) is not more than 15%, preferably not more than 8%, and more preferably not more than 3% by weight
  in the case of alkyd resins (A4) is not more than 25%, preferably not more than 10%, and more preferably not more than 5% by weight.

Preference is further given to those polymer dispersions in which the particle size of the polymer (A) as measured using the Malvern® Autosizer 2 C,
  in the case of polyacrylates (A1) is between 50 and 400 nm, more preferably between 80 and 250 nm,
  in the case of polyurethanes (A2) is <1000 nm, more preferably <500 nm, very preferably <200 nm, and in particular between 20 and below 200 nm,
or
  in the case of styrene-butadiene polymers (A3) is between 50 and 400 nm, more preferably between 80 and 250 nm
  in the case of alkyd resins (A4) is between 50 and 400 nm, more preferably between 80 and 250 nm.

The crosslinking components (B) may contain thermally crosslinking groups.

Examples of suitable thermal crosslinkers are crosslinkers based on epoxides, in which two or more epoxy groups are joined to one another via a linking group. Examples comprise low molecular mass compounds having two epoxy groups, such as hexanediol diglycidyl ether, phthalic acid diglycidyl ether or cycloaliphatic compounds such as 3,4-epoxycyclohexanemethyl 3',4'-epoxycyclohexanecarboxylate. Further examples of suitable crosslinkers comprise crosslinkers based on amino resins, examples being melamine-formaldehyde resins, urea-formaldehyde resins or tris(alkoxycarbonyl)triazines.

Blocked polyisocyanates are used with particular preference as crosslinkers. On blocking, the isocyanate group is reacted reversibly with a blocking agent. On heating to higher temperatures, the blocking agent is eliminated again. Examples of suitable blocking agents are disclosed in DE-A 199 14 896, column 12 line 13 to column 13 line 2.

Blocking agents are described in D. A. Wicks, Z. W. Wicks, Progress in Organic Coatings, 36, 148-172 (1999), 41, 1-83 (2001) and also 43, 131-140 (2001).

Examples of suitable classes of compound are phenols, imidazoles, triazoles, pyrazoles, oximes, N-hydroxy imides, hydroxybenzoic esters, secondary amines, lactams, CH-acidic cyclic ketones, malonic esters or alkyl acetoacetates. Preference is given to acetone oxime, butanone oxime, ε-caprolactam, 3,5-dimethylpyrazole, diethyl malonate, phenol, and tert-butylbenzylamine.

If a crosslinker is used separately it is usual to use 0.5% to 10%, preferably 1% to 8%, and more preferably 2% to 6% by weight. It will be appreciated that mixtures of different crosslinkers can also be used, provided that this does not have an adverse effect on the properties of the coat.

The compositions of the invention may further comprise at least one component (C) selected from the group of finely divided fillers, pigments, and dyes.

The finely divided filler is generally an inorganic filler. Fillers and/or pigments may of course comprise an additional organic coating, for hydrophobicizing or hydrophilicizing, for example.

The filler ought not to exceed an average particle size of 10 μm. The average particle size is preferably 10 nm to 8 μm, more preferably 100 nm to 5 μm, and, for example, 2 to 4 μm. In the case of round or approximately round particles this figure refers to the diameter; in the case of particles of Irregular shape, such as needle-shaped particles, for example, it refers to the longest axis. By particle size is meant the primary particle size. The skilled worker is aware of course that finely divided solids frequently undergo agglomeration into larger particles, which for use must be dispersed intensively. The particle size is chosen by the skilled worker in accordance with the desired properties of the coat.

The pigments may in particular be anticorrosion pigments. These may include both active and passive anticorrosion pigments.

Examples of active anticorrosion pigments comprise, in particular, phosphates, phosphate-containing or modified phosphates such as pigments based on zinc phosphate, zinc aluminum orthophosphate, zinc molybdenum orthophosphate, zinc aluminum molybdenum orthophosphate, calcium hydrogen phosphate, zinc calcium strontium orthophosphate silicate, zinc aluminum polyphosphate, strontium aluminum polyphosphate, zinc calcium aluminum strontium orthophosphate polyphosphate silicate, calcium aluminum polyphosphate silicate. Further examples comprise combinations of inorganic phosphates with electrochemically active organic corrosion inhibitors of low solubility, such as zinc phosphate modified with Zn salts or Ca salts of 5-nitroisophthalic acid. In addition it is also possible to use iron phosphide, zinc hydroxyphosphide, borosilicate pigments such as barium metaborate or zinc borophosphates, molybdates such as zinc molybdate, sodium zinc molybdates or calcium molybdate, pigments having ion exchange properties such as amorphous $SiO_2$ modified with calcium ions, or correspondingly modified silicates, metal oxides such as ZnO, for example, or else metal powders such as zinc dust, for example. It will be appreciated that typical organic anticorrosion pigments can also be used, such as Zn salts or Ca salts of 5-nitroisophthalic acid, for example.

Passive anticorrosion pigments lengthen the diffusion pathways for corrosive components and thereby increase the corrosion resistance. Examples comprise, in particular, platelet-shaped or lamelliform pigments such as mica, hematite, phyllosilicates, linear polysilicates such as wollastonite, talc, or metal plates such as aluminum plates or iron plates.

Further details on anticorrosion pigments are disclosed for example in "Pigments, 4.2 Anticorrosive Pigments" in Ullmann's Encyclopedia of Technical Chemistry, 6th Edition 2000, Electronic Release.

The pigments may also be typical color pigment and/or effect pigment.

By effect pigments are meant all pigments which exhibit a platelet-shaped construction and impart specific decorative color effects to a surface coating. Effect pigments are known to the skilled worker. Examples comprise straight metal pigments such as aluminum, iron or copper pigments, interference pigments, such as titanium dioxide-coated mica, iron oxide coated mica, mixed oxide-coated mica (with titanium dioxide and $Fe_2O_3$, for example), metal oxide-coated aluminum, or liquid-crystal pigments, for example.

Color pigments are, in particular, typical organic or inorganic absorption pigments that can be used in the paint industry. Examples of organic absorption pigments are azo pigments, phthalocyanine, quinacridone, and pyrrolopyrrole pigments. Examples of inorganic absorption pigments are iron oxide pigments, titanium dioxide, and carbon black.

Examples of dyes are azo, azine, anthraquinone, acridine, cyanine, oxazine, polymethine, thiazine, and triarylmethane dyes. These dyes may find application as basic or cationic dyes, mordent dyes, direct dyes, disperse dyes, ingrain dyes, vat dyes, metal complex dyes, reactive dyes, acid dyes, sulfur dyes, coupling dyes or substantive dyes.

Fillers can be used to influence the properties of the coating, such as, for example, hardeners, rheology or the orientation of the effect pigments. Fillers are frequently coloristically inactive; in other words, their inherent absorption is low and the refractive index is similar to that of the coating medium. Examples of fillers comprise talc, calcium carbonate, kaolin, barium sulfate, magnesium silicate, aluminum silicate, crystalline silicon dioxide, amorphous silica, aluminum oxide, microbeads or hollow microbeads made, for example, of glass, ceramic or polymers and having sizes of 0.1-10 μm for example. As fillers it is additionally possible to use any desired solid inert organic particles, such as urea-formaldehyde condensation products, micronized polyolefin wax or micronized amide wax, for example. The inert fillers may each also be used in a mixture. Preferably, however, only one filler is employed in each case.

The fraction of the pigments and/or fillers in the polymer dispersion is preferably 15% to 40%, more preferably 20% to 40%, and very preferably 20% to 35% by volume. The precise amount is set by the skilled worker in accordance with the desired properties of the coat. When conductivity pigments are used, the amounts employed are typically greater than when nonconducting fillers are used.

In contradistinction to other figures, the pigment and/or filler fraction is given here in % by volume, as a measure of the pigment volume concentration (PVC) relative to the bulk density of the pigment and/or filler and to the volume of the polymer dispersion.

The pigment volume concentration is typically defined as the ratio formed from the total volume of the solid inorganic constituents (pigment and fillers) divided by the total volume of the solid inorganic constituents (pigments and fillers) and of the polymer particles of the aqueous binder polymer dispersion; see Ullmanns Enzyklopädie der technischen Chemie, 4th Edition, Volume 15, p. 668.

It will be appreciated that mixtures of different pigments can also be used. The pigments are typically in an amount of 20% to 70% by weight. The precise amount is determined by the skilled worker in accordance with the desired properties of the coat. When conductivity pigments are being used, the amounts employed are typically greater than when nonconducting fillers are used. Preferred amounts for conductive pigments and fillers are 40% to 70% by weight; preferred amounts for nonconductive pigments are 20% to 50% by weight.

Compounds (D) are those which comprises at least one thioamide group ($-(C=S)-NR^1R^2$), preferably 1 to 6, more preferably 1 to 4, very preferably 1 to 3, in particular 1 to 2, and especially 2.

Further preferred compounds (D) are compounds (D1) which contain at least one thioamide group ($-(C=S)-NR^1R^2$) and at least one further functional group which is other than a thioamide group ($-(C=S)-NR^1R^2$) (see below).

Further preferred compounds (D) have 1 to 20 carbon atoms, not including any carbon atoms present in radicals $R^1$ and $R^2$, and preferably have 2-20, more preferably 3-20, very preferably 4-20, in particular 5-20, and especially 6-20 carbon atoms.

Preference among the compounds (D) is given to those which have a solubility in ethylene glycol mono-n-butyl ether (butyl glycol) at 23° C. of at least 100 g/l.

Particular preference is given to those combinations of thioamides (D) and binders (B) in which the thioamide (D) or its solubility and the HLB value of the binders (B) is selected such that thioamides and binders are highly compatible, i.e., exhibit effective compatibility.

In the compounds (D) containing at least one thioamide group (I) $-(C=S)NR^1R^2$, $R^1$ and $R^2$ are each independently H or a linear or branched, optionally substituted alkyl radical having 1 to 20 C atoms, preferably 1 to 10 C atoms, and more preferably 1 to 6 C atoms. $R^1$ and $R^2$ may also be a cycloalkyl radical having 3 to 12 C atoms or aryl radical having 6 to 12 C atoms, it also being possible for the radicals $R^1$ and $R^2$ together with the nitrogen atom to form a five- to 12-membered ring. Additional substituents may in particular be oxygenous or nitrogenous substituents, examples being OH groups or $H_2$ groups. Furthermore, in radicals containing at least 3 C atoms, nonadjacent and nonterminal C atoms may be replaced by O and/or N atoms. Examples of preferred radicals $R^1$ and $R^2$ comprise methyl, ethyl, n-propyl, isopropyl, n-butyl, isobutyl, tert-butyl, n-pentyl, and n-hexyl groups. Preferably at least one of the radicals $R^1$ and $R^2$ is H and more preferably both radicals are H.

The thioamides employed inventively are preferably compounds (D1) of the general formula (II) $R^4_n-R^3-(C=S)NR^1R^2$ which contain a thioamide group and also one or more functional groups, and/or are compounds (D2) which contain at least two thioamide groups.

In compounds (D1) the thioamide group is linked via the (n+1)-valent hydrocarbon radical $R^3$ to n functional groups $R^4$, n being a natural number from 1 to 5. Preferably n is 1 to 3 and more preferably it is 1 or 2.

$R^3$ is preferably an (n+1)-valent aliphatic, cycloaliphatic, aromatic or araliphatic hydrocarbon radical having 1 to 30 C atoms, preferably 1 to 20 C atoms, and more preferably 1 to 10 C atoms. The hydrocarbon radical may optionally also be interrupted by heteroatoms, but is preferably a plain hydrocarbon radical. For the skilled worker it is self-evident that the values of n which are possible in principle are also guided by the number of C atoms. As a general rule, there is on average not more than one functional group per C atom of the hydrocarbon radical $R^3$.

Attached to the radical $R^3$ are the thioamide group, on the one hand, and also n functional groups $R^4$. These functional groups can be of the same kind or else may be different kinds of functional groups.

The functional groups $R^4$ may for example be ether groups, imino groups, keto groups, aldehyde groups, $-OH$, $-NH_2$, $-NHR^5$, $-NR^5R^{5'}$, $-COOH$, $-COOR^5$, $-CONH_2$, $-CONHR^5$, $-CONR^5R^{5'}$, $-NHCOR^5$, $-NR^{5'}COR^5$, $-NHCONHR^5$, $-SH$, $-CN$, $-Si(OH)_3$, $-SO_3H$, $-PO(OH)_2$, $-Si(OR^5)_3$, $-PO(OR^5)_2$ or $-PS(OR^5)_2$, $R^5$ and $R^{5'}$ each independently being an alkyl radical, preferably a linear or branched alkyl radical, having 1 to 6, preferably 1 to 4, C atoms, and with very particular preference are each $-CH_3$. Additionally conceivable are quaternary or quaternized ammonium groups.

In this context it is possible for at least some acidic groups to be present as anions, and for at least some basic groups to be present in protonated form.

In one preferred embodiment of the invention, functional groups $R^4$ are groups of the kind containing only N and/or O atoms as heteroatoms. Examples of such groups comprise ether groups, imino groups, $-OH$, $-NH_2$, $-NHR^5$, —$NR^5R^{5'}$, —COOH, —$COOR^5$, —$CONH_2$, —$CONHR^5$, —$CONR^5R^{5'}$, —$NHCOR^5$, —$NR^{5'}COR^5$, —$NHCONHR^5$.

The functional group preferably comprises ether groups, —OH and/or —$NH_2$.

Ether groups are particularly preferred.

In one preferred embodiment of the invention the radical $R^3$ is a divalent aliphatic, cycloaliphatic or aromatic hydrocarbon radical. The hydrocarbon radical may optionally also be interrupted by heteroatoms, but is preferably a plain hydrocarbon radical. In this case mention may be made in particular of linear 1,ω-alkylene radicals of the general formula —$(CH_2)_k$—, k being a natural number from 1 to 30, preferably 1 to 20, and more preferably 1 to 10. The radicals in question may also be divalent aromatic radicals, such as 1,4-phenylene, for example, or substituted aromatic radicals of the general formula —$(CH_2)_{k'}$—$(C_6H_4)$— or —$(CH_2)_{k'}$—$(C_6H_4)$—$(CH_2)_{k''}$—, k' and k" each independently being a natural number from 1 to 10, preferably 1 to 3.

Examples of particularly preferred thioamides (D1) comprise ω-hydroxycarboxylic thioamides of the general formula HO—$(CH_2)_k$—(C=S)$NR^1R^2$, the radicals and indices being defined as indicated above. k in these compounds is preferably 3 to 8. Examples of such compounds comprise 2-hydroxythioacetamide, 3-hydroxythiopropionamide, 4-hydroxythiobutaneamide, 5-hydroxythiopentaneamide, 6-hydroxythiohexaneamide, 7-hydroxythioheptaneamide or 8-hydroxythiooctaneamide, 9-hydroxythiononaneamide or 10-hydroxythiodecaneamide.

Preferred thioamides (D1) further comprise ω-alkyloxycarboxylic thioamides of the general formula $R^{11}$—O—$(CH_2)_k$—(C=S)$NR^1R^2$, the radicals and indices being defined as indicated above. k in these compounds is preferably 1 to 8.

$R^{11}$ here may be a linear or branched, optionally substituted alkyl radical having 1 to 20 C atoms, preferably 1 to 10 and more preferably 1 to 8 carbon atoms. Examples thereof are methyl, ethyl, isopropyl, n-propyl, n-butyl, isobutyl, sec-butyl, tert-butyl, n-hexyl, n-heptyl, n-octyl, n-decyl, n-dodecyl, n-tetradecyl, n-hexadecyl, n-octadecyl, n-eicosyl, and 2-ethylhexyl.

Examples of such thioamides are the methyl, ethyl, isopropyl-, n-butyl-, tert-butyl, and 2-ethylhexyl ethers of 2-hydroxythioacetamide, 3-hydroxythiopropionamide, 4-hydroxythiobutanamide, 5-hydroxythiopentanamide, 6-hydroxythiohexanamide, 7-hydroxythioheptanamide, 8-hydroxythiooctanamide, 9-hydroxythiononanamide, and 10-hydroxythiodecanamide.

Preferred thioamides (D1) further comprise ω-alkoxylated hydroxycarboxylic thioamides of the general formula H-$[X_i]$j-O—$(CH_2)_k$—(C=S)$NR^1R^2$, the radicals and indices being defined as indicated above. k in these compounds is preferably 1 to 8.

Each $X_i$ can for i=1 to j independently of one another be selected from the group of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$-CHPh-O—, and —CHPh-$CH_2$—O—, preferably from the group of —$CH_2$—$CH_2$—O—, —$CH_2$—$CH(CH_3)$—O—, and —$CH(CH_3)$—$CH_2$—O—, and more preferably —$CH_2$—$CH_2$—O—, Vin is a vinyl group, Ph is a phenyl group, and j can be a number from 1 to 250.

With preference at least 50 mol %, preferably 70 mol % and more preferably 100 mol % of the radicals are ethylene oxide radicals.

The compounds (D2) containing at least two thioamide groups may in the most simple case be dithiooxamide $R^1R^2N$(S=C)—(C=S)$NR^1R^2$.

Apart from these, the compounds in question are compounds of the general formula $R^6$(—(C=S)$NR^1R^2)_m$, in which m thioamide groups are joined to one another by a linking group $R^6$, and n is a natural number of at least two, preferably 2 to 20. The compounds may be low molecular mass compounds, oligomeric compounds or polymeric compounds.

The linking group $R^6$ comprises linear or branched aliphatic, cycloaliphatic, aromatic and/or araliphatic hydrocarbon radicals, in which it is also possible for nonadjacent C atoms to be interrupted or substituted by heteroatoms, especially O and/or N atoms, or functional groups, and which additionally may also contain functional groups. Additional functional groups may in particular be the groups $R^4$ defined above.

In one preferred embodiment of the invention D2 are low molecular mass compounds. $R^6$ in this case has 1 to 30 C atoms, preferably 2 to 20 C atoms, and more preferably 2 to 10 C atoms, and m in these compounds has a value of 2 to 6, preferably 2 to 4, and more preferably 2.

In one particularly preferred embodiment (D2) is a thioamide of the general formula (III) $R^1R^2N$(S=C)—$R^7$—(C=S)$NR^1R^2$. $R^7$ in this case is a divalent linking group comprising 1 to 30 C atoms.

$R^7$ comprises, in particular, linear 1,ω-alkylene radicals of the general formula —$(CH_2)_k$—, k being a natural number from 1 to 30, preferably 2 to 20, and more preferably 2 to 8. The radicals in question may be divalent aromatic radicals, such as 1,4-phenylene, or substituted aromatic radicals of the general formula —$(CH_2)_{k'}$—$(C_6H_4)$— or —$(CH_2)_{k'}$—$(C_6H_4)$—$(CH_2)_{k''}$—, k' and k" each independently being a natural number from 1 to 10, preferably 1 to 3.

Examples of compounds D2 of this kind comprise malonyidithioamide, hexanedithioamide, 1,4-benzodithioamide or 1,2-benzodithioamide.

$R^7$ may with further preference comprise radicals of the general formula —$(CH_2)_{k'}$—$R^8$—$(CH_2)_{k''}$—, $R^8$ being a divalent functional group, in particular a functional group containing P. Examples of such groups comprise —OP(O)($OR^9$)O—, —P(O)($OR^9$)—, —P(S)($OR^9$)—, —P(S)($SR^9$), $R^9$ being H, a monovalent metal ion or an alkyl radical, preferably a linear or branched alkyl radical having 1 to 6 C atoms.

The preparation of compounds containing thioamide groups is known to the skilled worker. They may be prepared, for example, from the corresponding nitriles, by reaction with $H_2S$.

In another preferred embodiment of the invention (D2) is a polymer which comprises at least two terminal and/or pendant thioamide groups. The term "polymer" includes oligomers as well and comprises, in a conventional manner, high molecular mass compounds which are obtained starting from one or more monomers by polymerization. The polymers in question may be substantially linear polymers or else branched polymers. The average molar mass $M_n$ of the polymers containing thioamide groups is typically 300 to 10 000 000 g/mol, preferably 500 to 1 000 000 g/mol, and more preferably 1000 to 100 000 g/mol.

The thioamide groups in the polymer may be terminal groups or may be pendant groups. Pendant thioamide groups may be sited directly on the main polymer chain, or alternatively may be connected to the main polymer chain via a spacer.

The polymers may be prepared by first preparing polymers containing nitrile groups and, after the polymerization, reacting the nitrile groups with H₂S, in a way which is known in principle, to give thioamide groups. This is shown diagrammatically below for a polymer containing an acrylonitrile unit (scheme (I)).

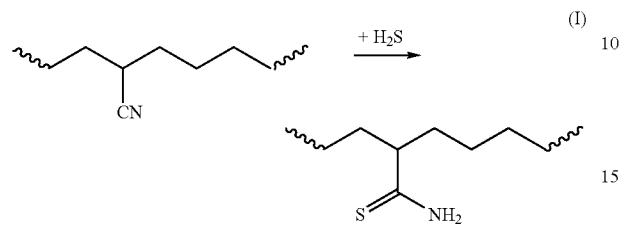
(I)

As starting material for the reaction it is possible in principle to use all kinds of homopolymers or copolymers which contain nitrile groups. The only restriction on the selection is that, in the reaction of H₂S with the polymer, there should be no adverse effects as a result of unwanted secondary reactions. Examples of suitable monomers for synthesizing polymers containing nitrile groups comprise α,ω-ethenylcarbonitriles, such as acrylonitrile, allylnitrile, butenenitrile, pentenenitrile or hexenenitrile, (meth)acrylamides of the general formula H₂C=C(CH₃)CONH—R¹⁰—CN or (meth)acrylic esters of the general formula H₂C=C(CH₃)COO—R¹⁰—CN, R¹⁰ in each case being a divalent hydrocarbon radical. Acrylonitrile is preferred. Examples of suitable comonomers comprise olefins, preferably vinylaromatic compounds such as styrene, α-methylstyrene or substituted styrenes, and also (meth)acrylic acid or (meth)acrylic esters such as, for example, methyl (meth)acrylate, ethyl (meth)acrylate, butyl (meth)acrylate or 2-ethylhexyl acrylate. Preferred starting material for performing the present invention comprises, for example, copolymers of styrene and acrylonitrile.

The reaction with the H₂S may be performed advantageously in the presence of a base. It may be performed, for example, using a pressure apparatus and using methanol as solvent. The degree of conversion can be determined, for example, by means of ¹³C NMR spectroscopy, by comparing the intensity of the CN— and CSNH₂ signals, and ought in general to be 20% to 100%, preferably 40% to 100%.

In accordance with the invention it is possible to use the compounds (D) in purified form or in the form of reactant-containing reaction mixtures, the reactant content being able to be up to 90%, preferably up to 75% or less.

A further possibility is to use monomers for the polymerization that additionally contain reactive groups which are able to react with suitable compounds containing thioamide groups. As an example, mention may be made of polymers which contain maleic anhydride groups and which can be reacted, for example, with ω-hydroxy thioamides or ω-amino thioamides, as shown exemplarily below in schemes (II) and (III), respectively.

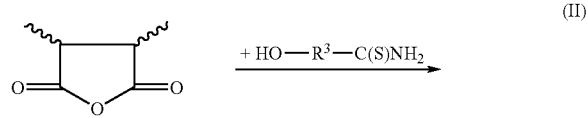
(II)

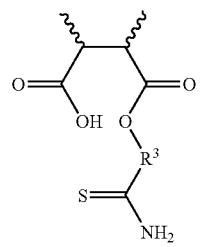

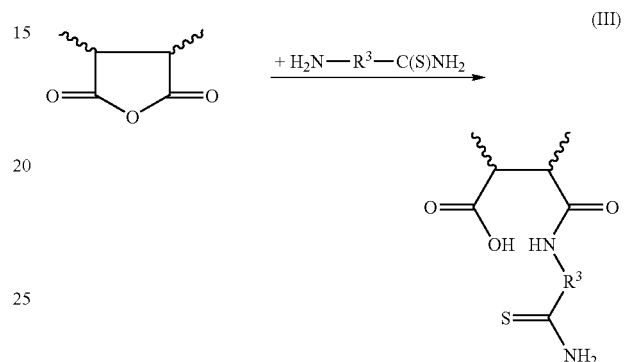
(III)

Polymers which have proven suitable include, for example, copolymers of maleic anhydride and comonomers such as (meth)acrylic acid, (meth)acrylates, vinyl ethers and/or olefins as starting material for the modification. By way of example the copolymers in question may be styrene-maleic anhydride copolymers.

To produce the coating materials it is possible to employ a single thioamide or else two or more different thioamides D1 and /or D2. From among the thioamides that are possible in principle, the skilled worker makes a specific selection in accordance with the desired properties of the coating material. To the skilled worker it is self-evident that not all kinds of thioamides D1 and/or D2 are equally suitable for all kinds of binder systems, solvent systems or surfaces. Through the selection of particular functional groups or of the linking group it is possible to tailor the thioamides optimally to particular systems. For example, compounds D1 and/or D2 that tend to be more hydrophilic or more hydrophobic can be prepared for specific use in aqueous coating systems or in organic coating systems, respectively.

It is possible, of course, to use the inventively employed thioamides D1 and/or D2 in a mixture with other thioamides, deviating from the above definition, with other thiocarbonyl compounds or, generally, with other corrosion preventive agents, provided that no negative properties arise. As a general rule, the fraction of the inventively employed thioamides ought to amount to at least 50%, preferably at least 75%, by weight with respect to the total amount of all organic corrosion preventive agents employed. With particular preference only thioamides D1 and/or D2 are employed.

The inventively employed thioamides are used typically in amount of 0.25% to 10%, preferably of 0.5% to 8%, and more preferably 1% to 6% by weight.

As component (E), the preparation of the invention generally comprises a suitable solvent, in which the components are in solution and/or dispersion, in order to allow uniform application to the surface. It is also possible in principle, however, to formulate the preparation in solvent-free or substantially solvent-free form, as a powder coating material. The use of a solvent is preferred.

Suitable solvents are those capable of dissolving, dispersing, suspending or emulsifying the compounds of the invention. These may be organic solvents, 5% to 25%, preferably 5% to 20%, more preferably 5% to 15% strength ammonia solution in water, or water. Naturally, mixtures of different organic solvents or mixtures of organic solvents with water can also be used. From among the solvents that are possible in principle, the skilled worker makes an appropriate selection in accordance with the desired end use and with the identity of the compound of the invention that is used.

Examples of organic solvents comprise hydrocarbons such as toluene, xylene or mixtures such as are obtained in the refining of crude oil, such as, for example, defined-boiling-range hydrocarbon fractions, ethers such as THF or polyethers such as polyethylene glycol, ether alcohols such as ethylene glycol mono-n-butyl ether (butyl glycol), propylene glycol monoethyl ether, dipropylene glycol monomethyl ether or propylene glycol monomethyl ether, ether glycol acetates such as butyl glycol acetate or propylene glycol monomethyl ether acetate, ketones such as acetone, alcohols such as methanol, ethanol or propanol, or lactams, such as N-methylpyrrolidone, N-ethylpyrrolidone, N-(n-butyl)pyrrolidone or N-cyclohexylpyrrolidone.

Also conceivable are aromatic or aliphatic hydrocarbons or mixtures thereof. Examples of such hydrocarbons are toluene or xylene. Preferred aromatic hydrocarbon mixtures are those which can comprise predominantly aromatic $C_7$ to $C_{14}$ hydrocarbons and encompass a boiling range from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising these.

Examples thereof are the Solvesso® products from ExxonMobil Chemical, especially Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® products from Shell. Hydrocarbon mixtures comprising paraffins, cycloparaffins, and aromatics are also available commercially under the names Kristalloel (for example, Kristalloel 30, boiling range about 158-198° C., or Kristalloel 60: CAS No. 64742-82-1), white spirit (likewise for example CAS No. 64742-82-1) or solvent naphtha (light: boiling range about 155-180° C.; heavy: boiling range about 225-300° C). The aromatics content of hydrocarbon mixtures of this kind is generally more than 90% by weight, preferably more than 95%, more preferably more than 98%, and very preferably more than 99% by weight. It may make sense to use hydrocarbon mixtures having a particularly reduced naphthalene content.

In addition it is also possible to use preparations which comprise water or a predominantly aqueous solvent mixture. By this are meant those mixtures which comprise at least 50%, preferably at least 65%, and more preferably at least 80% by weight of water. Further components are water-miscible solvents. Examples comprise monoalcohols such as methanol, ethanol or propanol, higher alcohols such as ethylene glycol or polyether polyols, and ether alcohols such as butyl glycol or methoxypropanol.

The amount of the solvents is chosen by the skilled worker in accordance with the desired properties of the preparation and the desired method of application. As a general rule, the weight ratio of the coat components to the solvent is 10:1 to 1:10, preferably about 2:1, without any intention that the invention should be restricted to such a ratio. It is of course also possible first to prepare a concentrate and to dilute it to the desired concentration only when on site.

The preparation is prepared by intensively mixing the components of the preparation with the solvents. Appropriate mixing or dispersing assemblies are known to the skilled worker.

In addition to components (A) to (D) and also, optionally, (E), the preparation may further comprise one or more auxiliaries and/or additives (F). Such auxiliaries and/or additives serve to fine-tune the properties of the coat. Their amount generally does not exceed 20% by weight of the sum of all the components bar the solvents, and preferably does not exceed 10%.

Examples of suitable adjuvants are color and/or effect pigments, reactive diluents for the thermal cure, rheological assistants, UV absorbers, light stabilizers, free-radical scavengers, free-radical addition polymerization initiators, thermal crosslinking catalysts, slip additives, polymerization inhibitors, defoamers, emulsifiers, devolatilizers, wetting agents, dispersants, adhesion promoters, flow control agents, film-forming auxiliaries, rheology control additives (thickeners), flame retardants, siccatives, antiskinning agents, other corrosion inhibitors, waxes, and matting agents, such as are known from the text book "Lackadditive" [Additives for coatings] by Johan Bieleman, Wiley-VCH, Weinheim, N.Y., 1998, or from German patent application DE 199 14 896 A 1, column 13 line 56 to column 15 line 54.

Preferred additives are dibutyltin dilaurate as a thermal crosslinking catalyst.

The composition of coating materials is typically as follows:
(A) 30-70, more preferably 35-65%, more preferably 40-55% by weight,
(B) (B) 10-50%, more preferably 20-40%, more preferably 20-30% by weight,
(C) (C) 15% to 45%, more preferably 20% to 45%, and very preferably 20% to 40% by volume,
(D) (D) 0.05% to 10%, more preferably 0.1% to 8%, and very preferably 0.2% to 6% by weight,
(E) (E) 0% to 45%, more preferably 0% to 35%, very preferably 0% to 25% by weight,
with the proviso that the sum of all the constituents makes 100% by weight.

The present invention further provides a mixture composed of
at least one dispersed binder (A),
at least one compound (D) comprising at least one thioamide group (—(C=S)—NR$^1$R$^2$), and
water.

These mixtures of the invention are valuable starting products for the preparation of coating materials for corrosion control.

Additionally provided is a process for producing coating materials for corrosion control, which comprises
first mixing a binder (A) in dispersion in water with at least one compound (D) comprising at least one thioamide group (—(C=S)—NR$^1$R$^2$) and
only after concluding the mixing of components (A) and (D) adding to the resultant mixture at least one pigment and/or filler.

The advantage of this preparation process is that the corrosion-inhibiting compounds (D) are not deactivated by absorption on pigments and/or fillers, so that the resultant coating materials exhibit a higher corrosion control effect.

To implement the process of the invention, the metallic surface is treated with the preparation.

In light, medium or heavy duty corrosion control this can be accomplished by means, for example, of spray application or spread application, the applied coat being subsequently cured under atmospheric conditions. It is of course also possible to apply two or more coatings, identical or different in composition, in succession. The overall thickness of corrosion control paints of this kind is determined by the skilled worker in accordance with the desired properties of the corrosion control coat. It amounts in general to at least 40 µm, preferably at least 50 µm, more preferably at least 60 µm, and very preferably at least 80 µm, in particular at least 100 µm, especially at least 125 µm, often at least 150 µm, and even at least 175 µm or at least 200 µm. The upper limit for the overall coat thickness, i.e., the thickness of all applied corrosion control coats together, is 2 mm, preferably less than 1.5 mm, more preferably less than 1 mm, very preferably less than 800 µm, and in particular less than 500 µm.

The coating materials of the invention may be applied in any desired way, for example by spreading or spraying.

The curing method is guided by the nature of the crosslinker and takes place as a general rule under atmospheric conditions.

The temperature needed for curing is guided in particular by the crosslinker employed. Highly reactive crosslinkers can be cured at lower temperatures than less reactive crosslinkers.

The term "atmospheric corrosion control" means in the context of this invention that the coating which comprises at least one thioamide (D) has a coat thickness after drying of at least 40 µm, preferably at least 50 µm, more preferably at least 60 µm, and very preferably at least 80 µm, and a coat thickness of up to 2 mm, preferably less than 1.5 mm, more preferably less than 1 mm, very preferably less than 800 µm, and in particular less than 500 µm, the coating composition curing following application to the surface under typical ambient conditions, i.e., for instance, at ambient temperature or at room temperature, in the presence of air and also typical atmospheric humidity, without the use of additional apparatus or installations. Typical cure temperatures, depending on the ambient environment, are more than 0 to 40° C., preferably 5 to 35° C., more preferably 10 to 30° C., and very preferably 15 to 25° C. in the presence of air and typical atmospheric humidity. The relative humidity may be whatever is desired, and is preferably between 10% and 80% and more preferably between 30% and 70%. It is clear to the skilled worker that the time to complete curing of a given binder system may differ according to the ambient conditions that are actually prevailing.

With particular preference the dispersions and preparations of the invention are used in corrosion control compositions which are employed in corrosiveness categories C2 (to DIN EN ISO 12944) or higher, preferably in categories C3 or higher, and more preferably in categories C4 or higher.

The corrosiveness categories in accordance with DIN EN ISO 12944, based on the mass loss per unit area or on the thickness reduction after the first year of exposure storage, are defined as follows for unalloyed steel and for zinc:

| C2 (low corrosivity): | unalloyed steel: | mass loss > 10-200 g/m² thickness decrease > 1.3-25 µm |
| --- | --- | --- |
| | zinc: | mass loss > 0.7-5 g/m² thickness decrease > 0.1-0.7 µm |
| C3 (medium corrosivity): | unalloyed steel: | mass loss > 200-400 g/m² thickness decrease > 25-50 µm |
| | zinc: | mass loss > 5-15 g/m² thickness decrease > 0.7-2.1 µm |

-continued

| C4 (high corrosivity): | unalloyed steel: | mass loss > 400-650 g/m² thickness decrease > 50-80 µm |
| --- | --- | --- |
| | zinc: | mass loss > 15-30 g/m² thickness decrease > 2.1-4.2 µm |
| C5-I/M (very high): | unalloyed steel: | mass loss > 650-1500 g/m² thickness decrease > 80-200 µm |
| | zinc: | mass loss > 30-60 g/m² thickness decrease > 4.2-8.4 µm |

EXAMPLES

Synthesis of 7-(2'-ethylhexyl)heptanethioamide

A mini autoclave was charged with 26.0 g (0.108 mol) of 7-(2-ethylhexoxy)heptano-nitrile and 15.9 g (0.217 mol) of diethylamine in 130 ml of ethanol.

7.4 g (0.217 mol) of hydrogen sulfide were injected and the mixture was stirred at 60° C. for 4 h. Subsequently the solvent was removed on a rotary evaporator and the crude product is purified by column chromatography. This gives 23.1 g of a yellow liquid (mixture of 25% product and 75% starting material).

Guideline Formulation for Corrosion Control Primers

Performance testing for atmospheric corrosion control is carried out using a corrosion control formulation based on a commercial aqueous styrene-acrylate dispersion for paints (Acronal® Optive 410, BASF Corp.). The dispersion used has the following properties:

| Solids content | 49-51% |
| --- | --- |
| pH | 7.5-8.5 |
| Brookfield viscosity | 500-1000 cps |
| Density | 1.06 g/cm³ |
| Minimum film forming temperature (MFFT (to ASTM D 2354)) | about 12° C. |
| Particle size | about 110 nm |

The test formula was prepared in accordance with the following general instructions:

393.4 g of the styrene-acrylate dispersion were admixed with 2.2 g of a commercial defoamer for coating materials (mixture of polysiloxanes and hydrophobic solids in polyglycol; BYK® 022, Byk), after which a mixture consisting of 0.6 g of an anionic dispersant (acidic phosphoric ester of a fatty alcohol alkoxylate; Lutensit® A-EP, BASF AG), 11.0 g of concentrated ammonia, and 58.6 g of water was added by means of a Dispermate. Incorporated additionally, with stirring, was a mixture of 7.2 g of phenoxypropanol (film-forming assistant) and 7.2 g of benzine 180-210° C. (film-forming assistant).

Added subsequently were 85.0 g of a hematite pigment (Bayferrox® 130 M, Lanxess), 82.1 g of an anticorrosion pigment based on zinc molybdenum phosphate (Heucophos® ZMP, basic zinc molybdenum orthophosphate hydrate, Heubach), 36.0 g of magnesium silicate (filler; talc 20 M 2, Luzenac), and 127.8 g of a filler based on barium sulfate and zinc sulfide (30% by weight ZnS) (Litopone® L). The mixture as a whole was dispersed with glass beads (ø3 mm) for at least 30 minutes.

Thereafter, with further stirring, a further 166.4 g of styrene-acrylate dispersion, 1.9 g of BYK® 022, and 3.7 g of a 1:1 mixture of water and a commercial corrosion inhibitor (corrosion inhibitor L 1, Erbslöh) were added, and the glass beads were removed by sieving.

To finish, the batch was admixed with a mixture of 3.7 g of a 25% strength solution of a commercial, urethane-based thickener (Collacral® PU 85, BASF AG) and 13.2 g of butyl glycol (solvent) and also, if appropriate, the pH was adjusted to about 9.5 using concentrated ammonia. This gives 1000 g of a corrosion control primer with a solids content of 61% and a pigment/volume concentration (PVC) of 23%.

100 g of the completed coating material were admixed with 2.5 g of a 33% strength solution of 7-(2'-ethylhexyl)heptanethioamide in butyl glycol (Example 1).

For comparison purposes, a further sample of the coating material was left without addition of a thioamide (Comparative Example 1).

Application of the Formulations through Steel Panels, Preparation for the Salt Spray Test The primers under test were diluted with fully demineralized water to the desired viscosity (300 to 1000 mPas (ICI Rotothinner sphere)) and drawn down using a box-type doctor blade onto a cleaned, nongalvanized steel panel (200×80× 0.9 mm); the slot size of the doctor blade is selected so as to give a dry coat thickness of 60-85 μm.

After six days of drying at room temperature and one day of thermal conditioning at 50° C., the reverse of the metal test panel was coated with a solvent-based coating material, for protection from corrosion, and the edges were taped off with Tesa®-film.

To end with, the metal test panel was inscribed down to the substrate, using a scorer, on the side coated with the primer under test.

Salt Spray Test/Evaluation

Using the test panels, a salt spray test was conducted in accordance with DIN EN ISO 7253 (test duration: 240 h). The metal panels are pictured in FIG. 1 (Comparative Example 1 on the left, Example 1 in the middle, repetition of Example 1 on the right-hand side).

It is clearly apparent that the metal panel of Example 1 is much less corroded than Comparative Example 1.

The invention claimed is:

1. A method for the control of atmospheric corrosion of a metallic surface comprising coating the metallic surface with a coating material comprising at least one compound having at least one thioamide group of formula (I):

$$R^4{}_n\text{—}R^3\text{—}(C\text{=}S)NR^1R^2 \quad (I)$$

wherein
$R^1$ and $R^2$ are independently selected from the group consisting of H, linear or branched, optionally substituted alkyl radical having 1 to 20 C atoms, cycloalkyl radical having 3 to 12 atoms and aryl radical having 6 to 12 C atoms or radicals $R^1$ and $R^2$ together with the nitrogen atom may form a five- to 12-membered ring;
n is a natural number from 1 to 5;
$R^3$ is a hydrocarbon radical of 1 to 30 C atoms having a valency of n+1;
$R^4$ is at least one functional group selected from the group consisting of an ether group, —OH and —NH$_2$
wherein the coating material has a thickness of at least 40 μm.
2. The method according to claim 1, wherein $R^4$ is at least one functional group selected from the group consisting of an ether group and —OH.
3. The method according to claim 1, wherein the coating material further comprises at least one binder selected from the group consisting of (meth)acrylate (co)polymers, partially hydrolyzed polyvinyl esters, polyesters, alkyd resins, polylactones, polycarbonates, polyethers, epoxy resin-amine adducts, polyureas, polyamides, polyimides, and polyurethanes.
4. The method according to claim 3, wherein the binder is at least one binder selected from the group consisting of a polyacrylate, a polyurethane, a styrene-butadiene polymer and a alkyd resin.
5. The method according to claim 3, wherein the DIN 53495 water absorption of the binder is:
not more than 25% for a polyacrylate binder,
up to 100%, for a polyurethane binder,
not more than 15% for a styrene-butadiene polymers, and
not more than 25% for an alkyd resins;
wherein the water absorption of the binder is determined by method 3 of DIN 53495, entitled "Testing of polymers—Determination of water absorption", over the course of 24 hours at 23° C.
6. The method according to claim 3, wherein the at least one binder comprises a polymer dispersion in which a particle size of a binder particle is:
between 50 and 400 nm for a polyacrylate binder, in the case of polyurethanes (A2)<1000 nm, for a polyurethane,
between 50 and 400 nm for a styrene-butadiene, and
between 50 and 400 nm, for a alkyd resin;
wherein the particle size is measured with a Malvern® Autosizer 2 C.
7. The method according claim 1, wherein the coating material further comprises at least one pigment and/or filler.
8. The method according to claim 1, wherein the compound having at least one thioamide group has 6 to 20 carbon atoms, not including any carbon atoms present in the radicals $R^1$ and $R^2$.
9. The method according to claim 1, wherein the compound having at least one thioamide group has a solubility in ethylene glycol mono-n-butyl ether at 23° C. of at least 100 g/l.
10. The method according to claim 2, wherein $R^4$ is an ether group.
11. The method according to claim 1, wherein the metallic surface is on one selected from the group consisting of a building, a bridge, a power mast, a tank, a container, a building, a pipeline, a power plant, a chemical plant, a ship, a crane, a post, a bulkhead, a valve, a pipe, a fitting, a flange, a coupling, a hall, a roof and a construction-grade steel.
12. The method according to claim 1, wherein the coating is cured at a temperature of greater than 0° C. and less than or equal to 40° C.
13. The method according to claim 1, wherein the coating is cured at a temperature of 10° C. to 30° C.
14. The method according to claim 12, wherein the coating is cured at a relative humidity between 10% and 80%.
15. The method according to claim 13, wherein the coating is cured at a relative humidity between 10% and 80%.
16. The method according to claim 12, wherein the coating is cured at a relative humidity between 30% and 70%.
17. The method according to claim 13, wherein the coating is cured at a relative humidity between 30% and 70%.

* * * * *